(12) United States Patent
Kotnis et al.

(10) Patent No.: US 10,972,514 B2
(45) Date of Patent: Apr. 6, 2021

(54) REESTABLISHMENT OF SESSION INITIATION PROTOCOL (SIP) DIALOGS

(71) Applicant: Avaya Inc., Santa Clara, CA (US)

(72) Inventors: Sanjog Kotnis, Pune (IN); Sreekanth Subrahmanya Nemani, Pune (IN); Mohan Vinayak Phadnis, Pune (IN); Anand Krishna Padhye, Pune (IN); Joel Ezell, Broomfield, CO (US); Eric Cooper, Kanata (CA); Harsh V. Mendiratta, East Brunswick, NJ (US); Tibor Lukac, Superior, CO (US); Stephen Andrew Baker, Arvada, CO (US)

(73) Assignee: Avaya Inc., Santa Clara, CA (US)

( * ) Notice: Subject to any disclaimer, the term of this patent is extended or adjusted under 35 U.S.C. 154(b) by 1138 days.

(21) Appl. No.: 14/882,783

(22) Filed: Oct. 14, 2015

(65) Prior Publication Data

US 2017/0111407 A1    Apr. 20, 2017

(51) Int. Cl.
*H04L 29/06* (2006.01)

(52) U.S. Cl.
CPC ........ *H04L 65/1083* (2013.01); *H04L 65/105* (2013.01); *H04L 65/1006* (2013.01); *H04L 65/1069* (2013.01)

(58) Field of Classification Search
CPC ............. H04L 65/1006; H04L 65/1069; H04L 65/1083; H04L 65/105; H04L 65/1066; H04L 67/141; H04L 67/14; H04L 29/12537; H04L 29/06197; H04W 76/02; H04W 72/0426; H04W 36/08; H04W 8/08
See application file for complete search history.

(56) References Cited

U.S. PATENT DOCUMENTS

| 7,472,200 | B1 * | 12/2008 | Taylor | H04L 45/00 709/227 |
| 8,599,834 | B2 * | 12/2013 | Potts | H04L 65/1006 370/352 |
| 2009/0031029 | A1 * | 1/2009 | Rice | H04L 67/14 709/227 |

(Continued)

OTHER PUBLICATIONS

Dutta et al., "Fast-handoff Schemes for Application Layer Mobility Management," Telcordia Technologies Inc., 2015, 5 pages.

*Primary Examiner* — Patrice L Winder
*Assistant Examiner* — Aye M Aung
(74) *Attorney, Agent, or Firm* — Sheridan Ross P.C.

(57) ABSTRACT

A communication session is established between a first communication device and a second communication device. The communication session comprises a first dialog between an application server and the first communication device. The first communication device uses a first network address in the first dialog. In response to an event, such as a first network interface failing, a SIP INVITE with replaces header message is received by the application server with a second address of the first communication device. In response to receiving the SIP INVITE with replaces header message from the first communication device with a second address of the first communication device, the first dialog between the application server and the first device is reestablished using the second network address.

20 Claims, 5 Drawing Sheets

(56) References Cited

U.S. PATENT DOCUMENTS

| | | | |
|---|---|---|---|
| 2010/0128718 A1* | 5/2010 | Shen .................. | H04L 65/1006 370/352 |
| 2013/0152175 A1* | 6/2013 | Hromoko .......... | H04W 36/0011 726/5 |
| 2015/0256680 A1* | 9/2015 | Davis .................. | H04L 65/608 370/352 |
| 2016/0021580 A1* | 1/2016 | Mufti ................ | H04W 36/0022 370/221 |

* cited by examiner

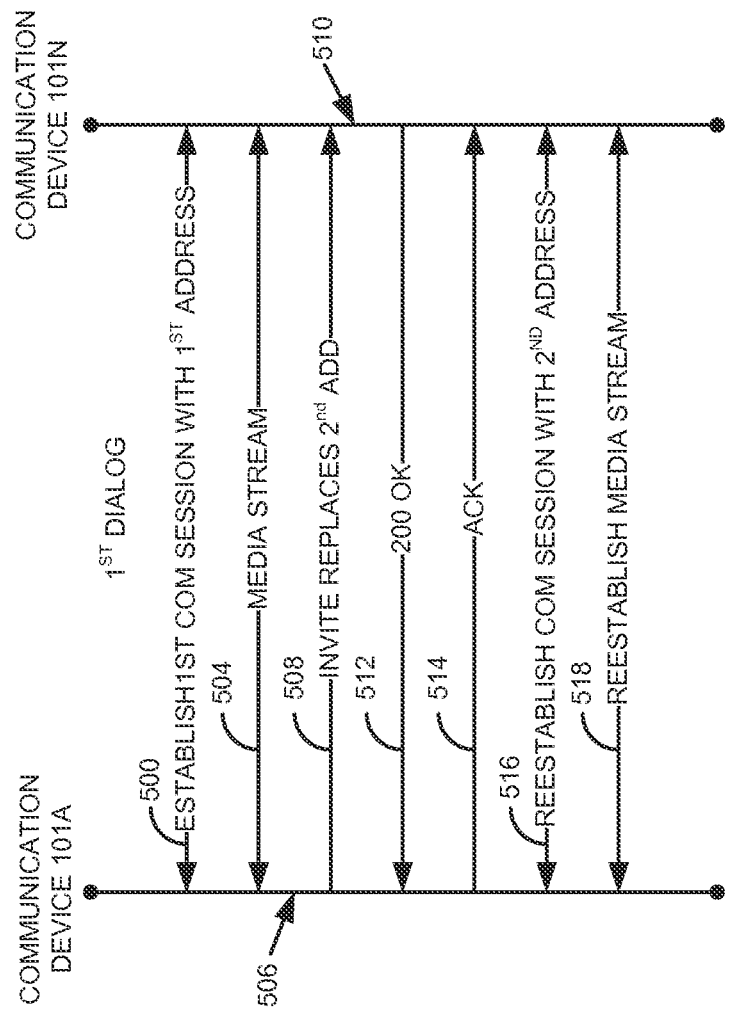

US 10,972,514 B2

REESTABLISHMENT OF SESSION INITIATION PROTOCOL (SIP) DIALOGS

TECHNICAL FIELD

The systems and methods disclosed herein relate to communication systems and in particular to SIP communication systems.

BACKGROUND

Today, some communication devices have multiple network interfaces. For example, a communication device may have both a wired and wireless interface. The interfaces typically use completely different networks that are segregated networks with different subnets. When a call is established, the call is established using one of the network interfaces. If the network interface that is supporting the call fails, the call is dropped. If supported, the user may be able to make a second call using the other network interface.

BRIEF SUMMARY

Systems and methods are provided to solve these and other problems and disadvantages of the prior art. A communication session is established between a first communication device and a second communication device. In one embodiment, the communication session comprises a single dialog between the first communication device and the second communication device. In a second embodiment the communication session comprises a first dialog between an application server and the first communication device. The first communication device uses a first network address in the first dialog. In response to an event, such as a first network interface failing, a SIP INVITE with replaces header message is sent by the first communication device with a second address of the first communication device. In response to receiving the SIP INVITE with replaces header message from the first communication device with a second address of the first communication device, the first dialog between the application server and the first device or the dialog between the first communication device and the second communication device is reestablished using the second network address.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

BRIEF DESCRIPTION OF THE DRAWINGS

FIG. 5 is a flow diagram of a process for reestablishing a SIP dialog of a peer-to-peer communication session when a communication device has to change a network address.

DETAILED DESCRIPTION

Figure 1:
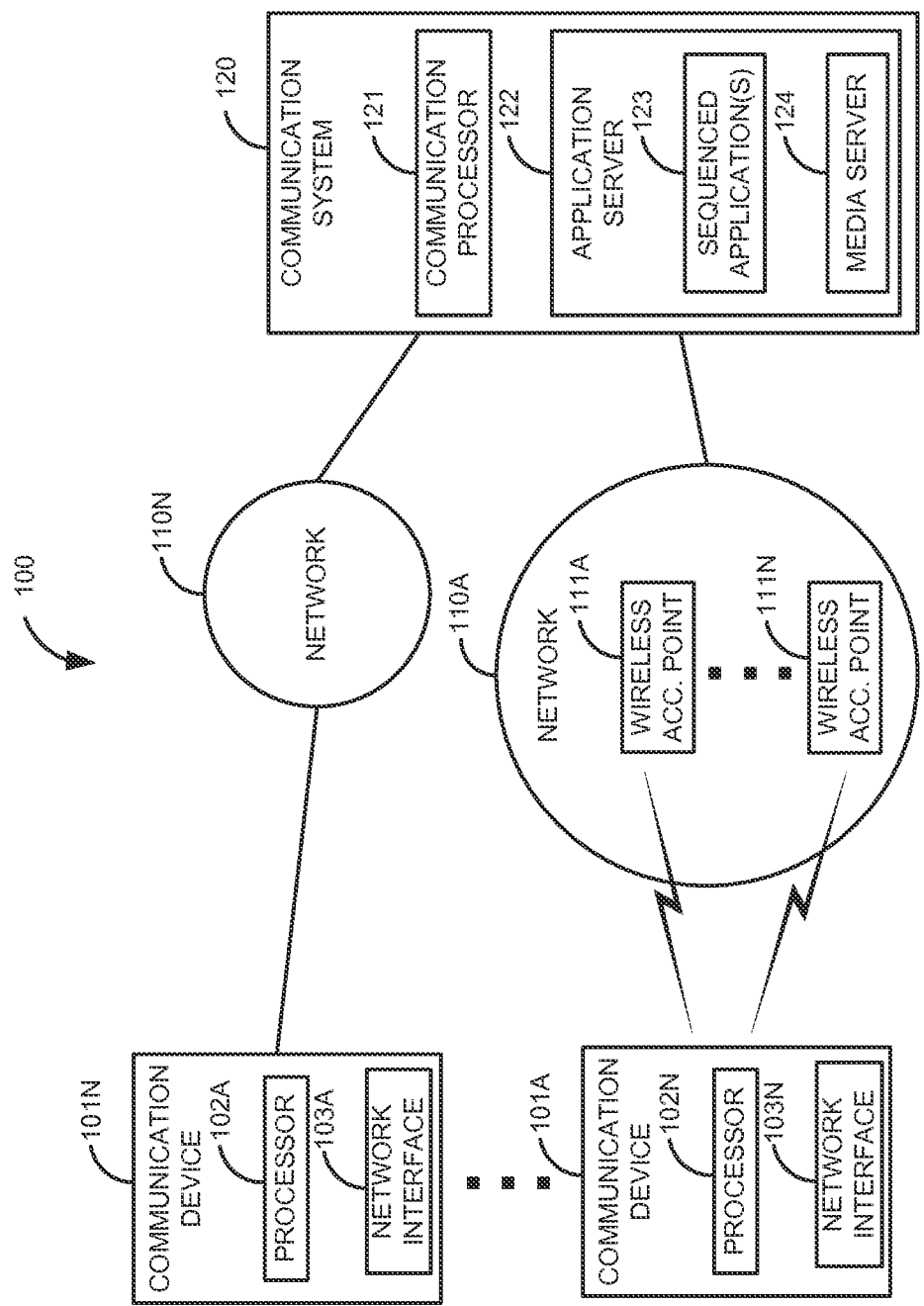
FIG. 1 is a block diagram of a first illustrative system for reestablishing a SIP dialog when a communication device moves between wireless access points.

FIG. 1 is a block diagram of a first illustrative system 100 for reestablishing a SIP dialog when a communication device 101 moves between wireless access points 111. The first illustrative system 100 comprises communication devices 101A-101N, networks 110A-110N, and a communication system 120.

The communication device 101 can be or may include any device that can communicate on the network 110, such as a Personal Computer (PC), a telephone, a video phone/system, a cellular telephone, a Personal Digital Assistant (PDA), a tablet device, a notebook device, a smart phone, and/or the like. As shown in FIG. 1, any number of communication devices 101A-101N may be connected to either of the networks 110A-110N, including only a single communication device 101. The communication devices 101A-101N further comprises processors 102A-102N and network interfaces 103A-103N.

The processors 102A-102N may be any hardware processor 102 that can process software/firmware, such as a microprocessor, a microcontroller, an application specific processor, a Digital Signaling Processor (DSP) and/or the like. The processors 102A-102N may comprise multiple processors 102.

The network interfaces 103A-103N can be or may include any hardware that uses software/firmware to send and receive communications from any of the networks 110A-110N. The network interfaces 103A-103N may support different types of hardware interfaces, such as wired interfaces, wireless interfaces, optical interfaces, and/or the like. The network interfaces 103A-103N may support a variety of protocols, such as Ethernet, 802.11, Token Ring, Sonnet, Global System for Mobile (GSM), WiFi, cellular, IPv4, IPv6, and/or the like. In some embodiments, a communication device 101 may comprise multiple network interfaces 103.

The networks 110A-110N can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a wired network, a wireless network, a fiber optic network, a combination of these, and the like. The networks 110A-110N can use a variety of electronic protocols, such as Ethernet, Internet Protocol (IP), Session Initiation Protocol (SIP), Integrated Services Digital Network (ISDN), and the like. Thus, the networks 110A-110N are electronic communication networks that carry messages via packets and/or circuit switched communications.

In this example, the network 110N is a wired network and the network 110A is a wireless network. In some embodiments, the network 110A may be a wired and/or a wireless network. The network 110A further comprises wireless access points 111A-111N. The wireless access points 111A-111N can be or may include any hardware device that can send and receive wireless communications to allow the communication device 101A (or other communication devices 101) to access the network 110A. For example, the wireless access points 111A-111N can be a WiFi wireless access point, an 802.11 wireless access point, a cellular access point, a Global System for Mobile (GSM) communications access point, and/or the like.

In FIG. 1, the communication device 101A can move within the network 110A and communicate on the network 110A using different ones of the wireless access points 111A-111N. In one embodiment, the wireless access points 111A-111N may use different Internet Protocol (IP) subnets for each of the wireless access points 111A-111N. Thus, when the communication device 101A connects to a different wireless access point 111, the communication device 101A may be required to get (e.g. using Dynamic Host Configuration Protocol (DHCP)) and use a new IP address to work on the different IP subnet. For example, as a strength of a signal received from the wireless access point 111A decreases and a signal strength of a signal received from the wireless access point 111N increases, the communication device 101A may switch to the wireless access point 111N and need to use a different IP address because the wireless access point 111N uses a different IP subnet.

The communication system 120 can be or may include any hardware coupled with software that can manage communication sessions between the communication devices 101A-101N, such as a Private Branch Exchange (PBX), a central office switch, a cellular switch, a router, a session manager, a communication manager, a proxy server (e.g., a SIP proxy server), and/or the like. The communication system 120 further comprises a communication processor 121 and an application server 122.

The communication processor 121 can be or may include any hardware processor coupled with firmware/software that allows communication sessions to be managed between the communication networks 110A-110N. For example, the communication processor 121 can provide management and connections services for real-time communication sessions, such voice communication sessions, video communication sessions, Instant Messaging communication sessions, virtual reality communication sessions, multimedia communication sessions, and/or the like. The communication processor 121 may also provide management and connection services for non-real-time communications sessions, such as text or email communications.

The application server 122 can be or may include any hardware/software that can provide services for communication sessions. The application server 122 is an application that is inserted into a communication session. When the application server 122 is inserted into the communication session between the communication devices 101A and 101N, the application server 122 will see communication messages that are sent to establish and maintain a communication session (e.g., an initial SIP INVITE message).

The application server 122 may further comprise one or more sequenced applications 123. The one or more sequenced applications 123 may be additional Back-to-Back User Agents (B2BUAs) or applications that are inserted into a communication session. For example, the sequenced application 123 may be a recording application, a call screening application, a video recording application, an Instant Messaging recording application, a multimedia configuration application, and/or the like.

In one embodiment, the application server 122 may not include any sequenced applications 123. In this embodiment, the application server 122 functions as a single sequenced application 123.

The application server 122 may further comprise a media server 124. The media server 124 can be or may include any hardware/software that can manage and relay media streams for a communication session. When a media server 124 is used in a communication session, the media stream (e.g. a Real-Time Protocol (RTP) or a Secure Real-Time Protocol (SRTP) media stream) will flow through the media server 124. For example, if a SIP voice communication session is established between the communication devices 101A and 101N using a Real-Time Protocol (RTP) media stream, the media server 124 would relay the RTP media stream between the communication devices 101A and 101N.

Figure 2:
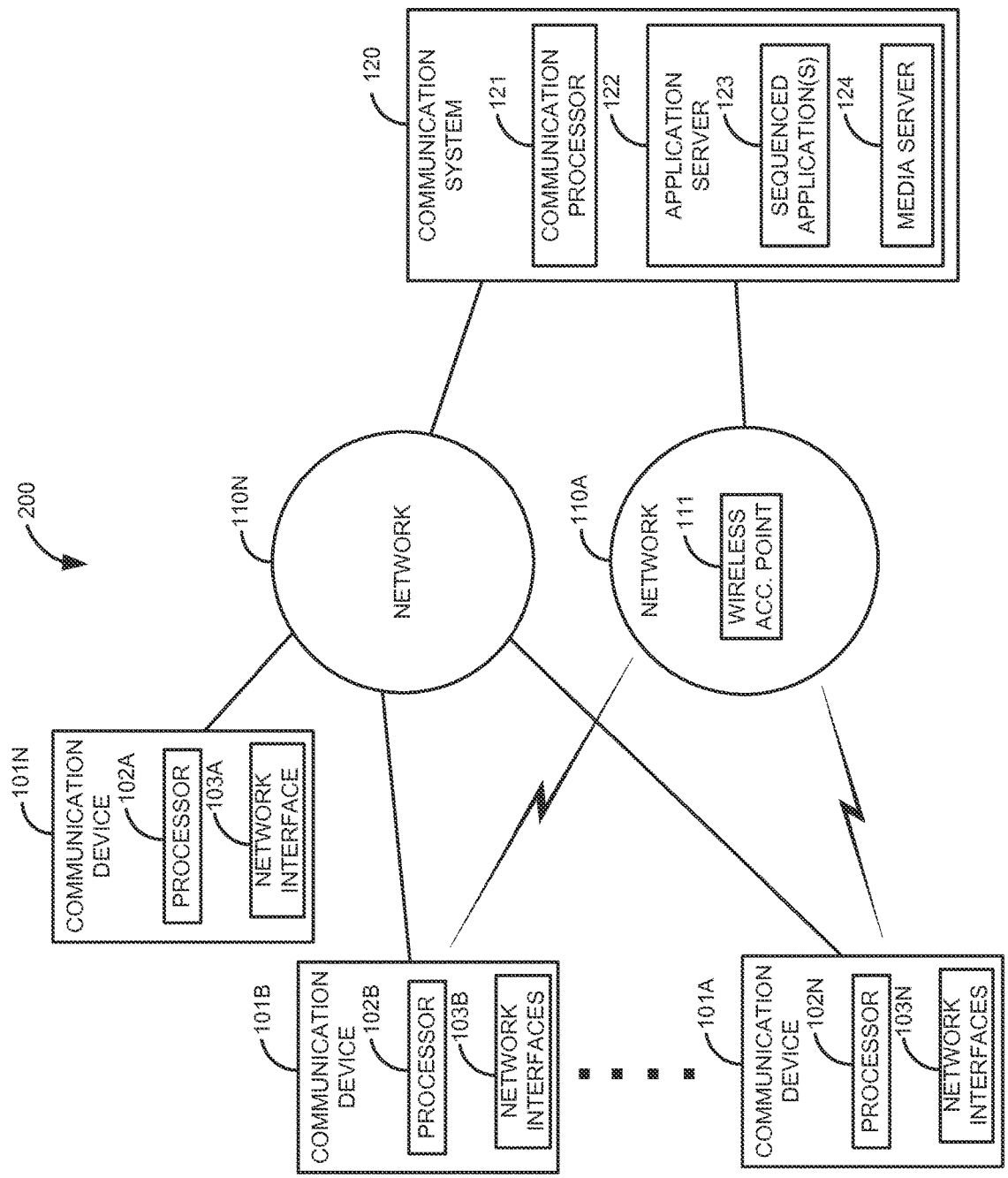
FIG. 2 is a block diagram of a second illustrative system for reestablishing a SIP dialog when a network interface fails or is unable to communicate.

FIG. 2 is a block diagram of a second illustrative system 200 for reestablishing a SIP dialog when a network interface 103 fails or is unable to communicate. The second illustrative system 200 includes the communication devices 101A-101N, the networks 110A-110N, and the communication system 120.

In FIG. 2, the communication devices 101A-101B each has at least two network interfaces 103 that can connect to the networks 110A-110N. For example, the communication devices 101A-101B are shown as having a wired connection to the network 110N and wireless connection to the network 110A. The network interfaces 103 described in FIG. 2 are not limiting. For example, the network interfaces 103 in a communication device 101 may be two more two wired network interfaces 103, two or more wireless network interfaces 103, or a combination of these. In FIG. 2, the network 110A is shown with only a single wireless access point 111. However, the network 110A may comprise one or more wireless access points 111.

Figure 3:
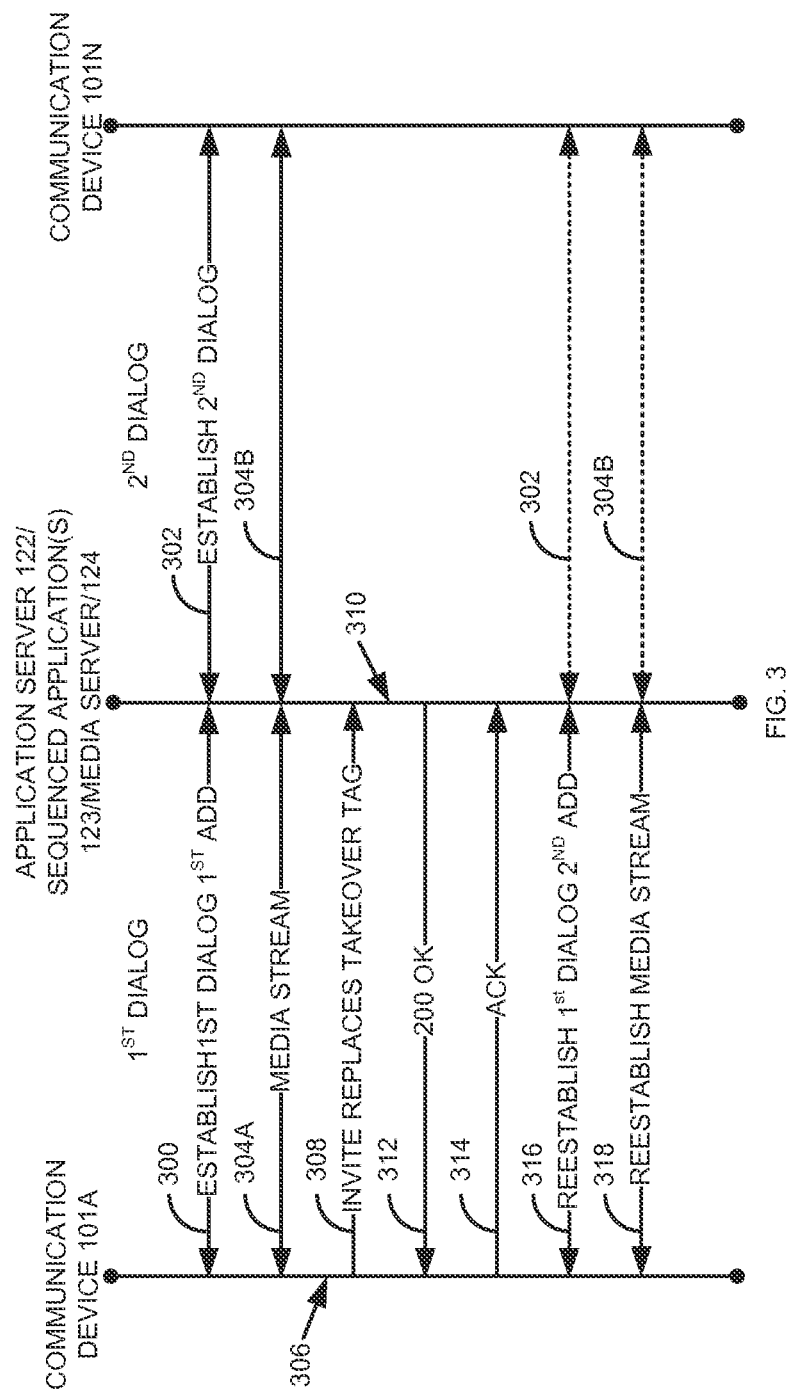
FIG. 3 is a flow diagram of a process for reestablishing a SIP dialog when a communication device has to change network addresses.
Figure 4:
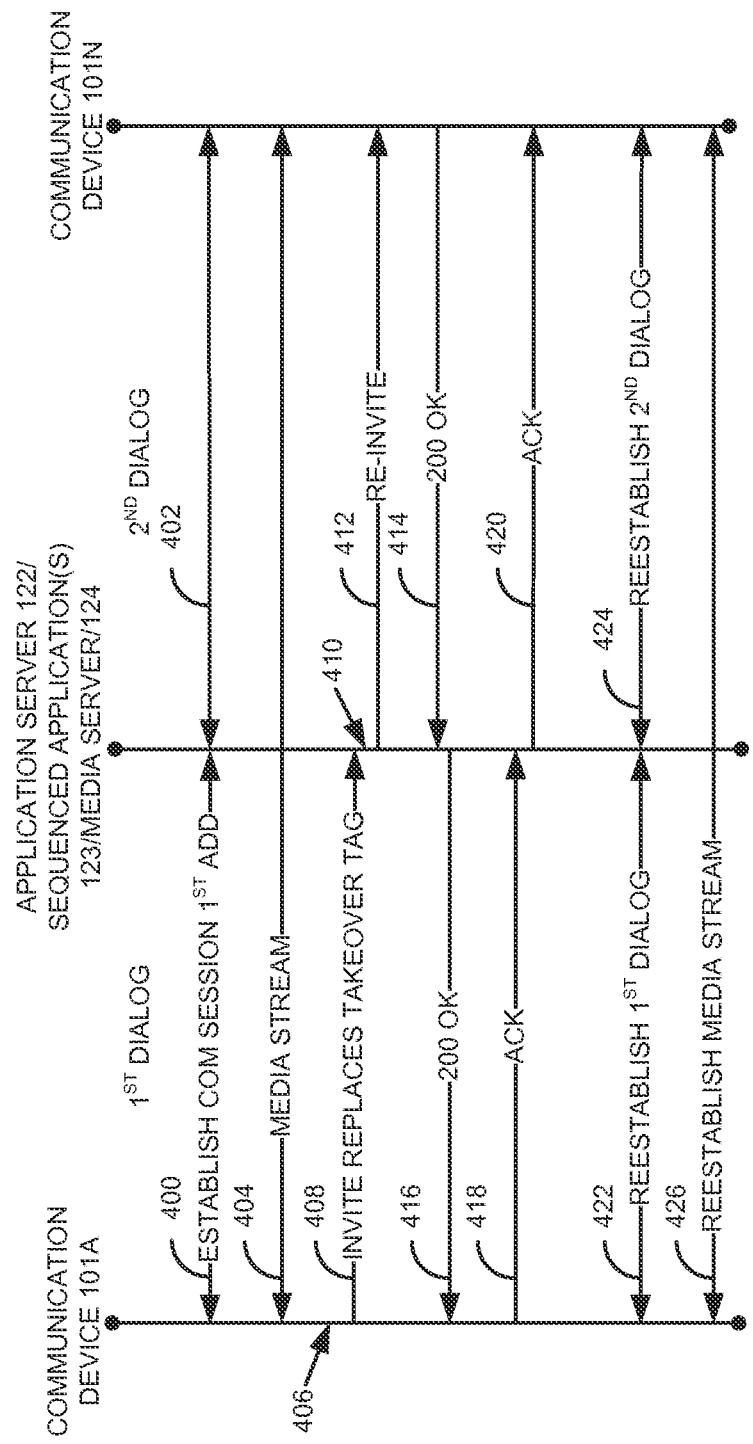
FIG. 4 is a flow diagram of a process for reestablishing SIP dialogs of a communication session when a communication device has to change network addresses.

FIG. 3 is a flow diagram of a process for reestablishing a SIP dialog when a communication device 101 has to change network addresses. Illustratively, the communication devices 101A-101N, the processors 102A-102N, the network interfaces 103A-103N, the wireless access points 111A-111N, the communication system 120, the communication processor 121, the application server 122, the sequenced application(s) 123, and the media server 124 are stored-program-controlled entities, such as a computer or processor, which performs the method of FIGS. 3-5 and the processes described herein by executing program instructions stored in a computer readable storage medium, such as a memory or disk. Although the methods described in FIGS. 3-5 are shown in a specific order, one of skill in the art would recognize that the steps in FIGS. 3-5 may be implemented in different orders and/or be implemented in a multi-threaded environment. Moreover, various steps may be omitted or added based on implementation.

The process described in FIG. 3 can work with equally well with either of the exemplary embodiments described in FIGS. 1-2. In FIG. 3, some of the well known SIP messages may not be shown for simplicity. For example, the SIP INVITE/SIP 200 OK/SIP ACK messages to establish the communication session (the first and second dialogs) in steps 300 and 302 are not shown. Establishing a communication session with a sequenced application 123 (a B2BUA) is described in ITEF RFC 4575 titled "Transparent Back-To-Back User Agent (B2BUA)," August 2006, which is incorporated herein by reference.

The process starts in steps 300 and 302 when a communication session between the communication device 101A and the communication device 101N is established. In this example, the application server 122, which may include one or more sequenced applications 123 is sequenced into the communication session. As a result, in SIP, two separate dialogs (the $1^{st}$ dialog and the $2^{nd}$ dialog) are created to establish the communication session. The first dialog is between the communication device 101A and the application server 122. The second dialog is between the communication device 101N and the application server 122. When the $1^{st}$ dialog is first established, the communication device 101A uses a first network address (e.g., an IP address) of the communication device 101A.

In steps 304A and 304B, a media stream is established via the media server 124. The media stream of steps 304A-304B can be established using known protocols, such as Real-Time Protocol (RTP) and Session Description Protocol (SDP). For example, the sequenced application 123 in the application server 122 may be a recording Back-to-Back User Agent (B2BUA) 123 that records a voice stream of a voice communication session between the communication devices 101A and 101N.

In step 306, an event occurs of where the communication device 101A needs to use a different network address to continue the communication session. For example, as described in FIG. 1, the communication device 101A may need to use a different network address because it is switching from one wireless access point 111A to another wireless access point 111N due to a change in signal strength.

In other embodiments, the communication device 101A may switch from a wireless network 110 to another wireless network 110. For example, the communication device 101A may switch from a WiFi network 110 to a cellular network 110 or from the cellular network to the WiFi network.

Alternatively, the communication device 101A may switch from a WiFi to the cellular network (e.g., GSM 3G/4G) or from the cellular network to the WiFi network. In one embodiment, the communication device 101A may switch from an IPv4 network to an IPv6 network or from the IPv6 network to the IPv4 network. In these examples, both network interfaces 103A may be running simultaneously.

Alternatively, as shown in FIG. 2, the communication device 101A may have two or more network interfaces 103A that can communicate on the networks 110A and 110N. If one of the network interfaces 103 fails or can no longer communicate on its respective network 110 (e.g., because of a network failure), the communication device 101A may attempt to reestablish the communication session (more specifically dialog 1) via the other network 110 using a network address of a different network interface.

The event of step 306 may be based on a user input. For example, the event may be where the user wants to move a call that is over a wired network interface 103 (e.g., via network 110N) to a wireless headset of the same communication device 101 (e.g., via network 110A).

The event of step 306 may be any event where the communication device 101A needs to use a different network address. For example, the event of step 306 may be based on an event where an IP address of a first IP subnet needs to be changed to a second IP address of a second IP subnet.

The event of step 306 may use a preconfigured rule that is based on an existing priority or location. For example the user may prefer to use WiFi at home and a GSM network outside the home. Alternatively, the user may prefer to use a wired interface at his/her desk and a wireless interface away from the desk.

In response to the event of step 306, the communication device 101A sends, in step 308, a SIP INVITE with replaces header message that includes a second network address (e.g., for a second IP subnet) to the application server 122. Normally the SIP INVITE with replaces header message is used to transfer a communication session from one device to another. However, in step 308, the SIP INVITE with replaces header message is not being used to transfer a communication session to another device. Instead, the SIP INVITE with replaces header message is being used to reestablish the first dialog using a different network address with the communication device 101A (the same device).

The SIP INVITE with replaces header message of step 308 also includes a takeover tag. The takeover tag is an additional field or header that is used to tell the application server 122 that the SIP INVITE with replaces header message is to be handled differently. The takeover tag may be in a SIP header, a SIP field, in a payload, and/or the like. If the takeover tag is present in the SIP INVITE with replaces header message, the application server 122 knows it does not need to reestablish the second dialog because the communication device 101A is not a different communication device 101 (which is what normally would happen when the SIP INVITE with replaces header message is received).

In response to receiving the SIP INVITE with replaces header message with the second network address from the communication device 101A in step 310, the application server 122 starts the process of reestablishing the first dialog by sending a SIP 200 OK message using the second network address in step 312. In response, the communication device 101A sends a SIP ACK message in step 314 to reestablish the first dialog. At this point the first dialog has been reestablished using the second network address in step 316. Since the $2^{nd}$ dialog that was established in step 302 has not changed, the communication session between the communication device 101A and the communication device 101N can continue.

The media stream is reestablished in step 318 as was initially done in step 304A except that the second network address is used. Since the media stream for the second dialog is still established (step 304B), the media stream between the communication device 101A, the media server 124, and the communication device 101N can continue.

To illustrate, consider the following example. The network interface 103A comprises two network interfaces: 1) one that is wired and 2) one that is wireless. A voice communication session is established between the communication device 101A and the communication device 101N, using the wired network interface 103A of the communication device 101A (steps 300 and 302) and a first IP address of the wired network interface 103A. In addition the voice media stream for the voice communication session is established (steps 304A-304B). The wired network interface 103A fails in step 306. In response, the communication device 101A sends a SIP INVITE with replaces header message with the takeover tag in step 308 using the wireless network interface 103A. The SIP INVITE with replaces header message includes the network address of the wireless interface 103A and the takeover tag. The application server 122 receives the SIP INVITE with replaces header message of step 308. The application server 122 (in response to seeing the takeover tag in step 310) starts the process of reestablishing the first dialog by sending a SIP 200 OK message using the second network address in step 312. The communication device 101A sends, using the wireless network interface 103A, a SIP ACK in step 314. The $1^{st}$ dialog is reestablish using the wireless network interface 103A and the network address of the wireless network interface 103A in step 316. This results in the communication session being reestablished because the second dialog is still established. The media stream is then reestablished for the $1^{st}$ dialog in step 318 using the wireless interface 103A, which results in the media stream being reestablished between the communication device 101A and the communication device 101N (via the media server 124).

FIG. 4 is a flow diagram of a process for reestablishing SIP dialogs of a communication session when a communication device 101 has to change network addresses. The process starts in step 400 when a $1^{st}$ dialog of a communication session is established between the communication device 101A and an application server 122. The second dialog between the application server 122 and the communication device 101N is established in step 402.

The media stream for the communication session is established in step 404. FIG. 4 is an exemplary embodiment of where the media stream does not go through the media server 124, but instead the media stream is sent directly between the communication devices 101A and 101N. The communication device 101A detects an event that requires that the communication device 101A to use a different network address in step 406. For example, any of the events described in step 306 would apply to the event of step 406, such as a moving between the wireless access points 111A and 111N or a failed network interface 103.

In response to the event of step 406, the communication device 101A sends a SIP INVITE with replaces header message in step 408. The SIP INVITE with replaces header message has the takeover tag and the second network address.

In response to receiving the SIP INVITE with replaces header message with the takeover tag and second network address in step 408, the application server 122 determines if there is a media server 124 involved in the communication session in step 410. In this example, the media server 124 is not involved in the communication session because the media stream does not flow through the media server 124. Since the media server 124 is not involved in the communication session, the application server 122 needs to send the second network address to the communication device 101N in order to reestablish the media stream with communication device 101A.

The application server 122 sends a SIP RE-INVITE message to the communication device 101N to reestablish the $2^{nd}$ dialog in step 412. The SIP RE-INVITE message of step 412 includes the second network address. In response, the communication device 101N sends a SIP 200 OK message in step 414. The application server 122 sends the SIP 200 OK to the communication device 101A in step 416. The communication device 101A sends a SIP ACK message in step 418. The SIP ACK is sent to the communication device 101N in step 420. These steps results in the 1$^{st}$ dialog and the 2$^{nd}$ dialog being reestablished in steps 422 and 424. The media stream is reestablished in step 426 because the communication device 101N now has the second network address of the communication device 101A (from the SIP RE-INVITE).

If the SIP RE-INVITE message of step 414 is unable to reach the communication device 101N because the communication device 101N has also changed its network address (e.g., there was a network failure where both communication devices 101A and 101N have switched network addressees to a new network 110), the initial attempt to reestablish the communication session will fail (steps 406, 408, and 414). However, the communication session will eventually be reestablished because the endpoint 101N will also send a SIP INVITE with replaces header (similar to step 406) to the application server. The application server 122 will now know the new address of the communication device 101A and send a SIP INVITE with replaces header to the communication device 101A.

In another embodiment, the SIP INVITE with replaces header message of step 408 may not include the takeover tag. In this example, the application server 122 would treat the SIP INVITE with replaces header like a regular SIP transfer.

FIG. 5 is a flow diagram of a process for reestablishing a SIP dialog of a peer-to-peer communication session when a communication device 101 has to change a network address. The process described in FIG. 5 is where there is a peer-to-peer communication session that does not involve the application server 122, the sequenced applications 123, or the media server 124. In this example, the communication system 120 may function like a SIP proxy server. The process of FIG. 5 is shown without a proxy server. However, the messages in FIG. 5 will be the same if a proxy server is involved.

The process starts in step 500 when a communication session between the communication device 101A and the communication device 101N is established. In FIG. 5, when the communication session is established between the communication device 101A and the communication device 101N, there is a single dialog (the 1$^{st}$ dialog) because the application server 122 is not involved in the communication session. When the communication session is first established, the communication device 101A uses a first network address (e.g., an IP address) of the communication device 101A.

In step 504, a media stream (e.g., a voice media stream) is established between the communication device 101A and the communication device 101N. The media stream of step 504 can be established using known protocols, such as Real-Time Protocol (RTP), Secure Real-Time Protocol (SRTP), and/or Session Description Protocol (SDP).

In step 506, an event occurs of where the communication device 101A needs to use a different network address to continue the communication session. For example, as described in FIG. 1, the communication device 101A may need to use a different network address because it is switching from one wireless access point 111A to another wireless access point 111N due to a change in signal strength.

In other embodiments, the communication device 101A may switch from a wireless network 110 to another wireless network 110. For example, the communication device 101A may switch from a WiFi network 110 to a cellular network 110.

Alternatively, as shown in FIG. 2, the communication device 101A may have two or more network interfaces 103A that can communicate on the networks 110A and 110N. If one of the network interfaces 103 fails or can no longer communicate on its respective network 110 (e.g., because of a network failure), the communication device 101A may attempt to reestablish the communication session via the other network 110 using a network address of a different network interface.

The event of step 506 may be based on a user input. For example, the event may be where the user wants to move a call that is over a wired network interface 103 (e.g., via network 110N) to a wireless headset of the same communication device 101 (e.g., via network 110A).

The event of step 506 may be any event where the communication device 101A needs to use a different network address. For example, the event of step 506 may be based on an event where an IP address of a first IP subnet needs to be changed to a second IP address of a second IP subnet.

In response to the event of step 506, the communication device 101A sends, in step 508, a SIP INVITE with replaces header message that includes a second network address (e.g., for a second IP subnet) to the communication device 101N. Normally the SIP INVITE with replaces header message is used to transfer a communication session from one device to another. However, in step 508, the SIP INVITE with replaces header message is not being used to transfer a communication session to another device. Instead, the SIP INVITE with replaces header message is being used to reestablish the communication session using a different network address with the communication device 101A (the same device).

In response to receiving the SIP INVITE with replaces header message with the second network address from the communication device 101A in step 510, the communication device 101N sends a SIP 200 OK message using the second network address in step 512. In response, the communication device 101A sends a SIP ACK message in step 514 to reestablish the communication session. At this point the communication session has been reestablished using the second network address in step 516. The media stream is reestablished in step 518 as was initially done in step 504 except that the second network address is used.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents. In addition, this application incorporates the following references in their entirety: New Working Group Request for Comments: 3261, entitled "SIP. Session Initiated Protocol," June 2002 and Network Working Group Request for Comments 3891 titled "The Session Initiation Protocol (SIP) "Replaces" Header," September 2004.

What is claimed is:

1. A method comprising:
   establishing, by a processor, a communication session between a first communication device and a second communication device, wherein the communication session comprises a first dialog between an application server and the first communication device and wherein the first communication device uses a first network address in the first dialog;
   receiving, by the processor, a SIP INVITE with replaces header message from the first communication device with a second network address of the first communication device; and
   in response to receiving the SIP INVITE with replaces header message from the first communication device with the second network address of the first communication device, reestablishing, by the processor, the first dialog between the application server and the first communication device using the second network address.

2. The method of claim 1, wherein the SIP INVITE with replaces header message further comprises a takeover tag that identifies to the application server that the SIP INVITE with replaces header message is to be handled differently than a normal SIP INVITE with replaces header message, wherein the takeover tag tells the application server that it does not need to reestablish a second dialog between the application server and the second communication device.

3. The method of claim 2, wherein the communication session also comprises a second dialog between the second communication device and the application server and wherein the application server does not reestablish the second dialog in response to receiving the SIP INVITE with replaces header message with the takeover tag.

4. The method of claim 1, wherein the communication session also comprises a second dialog between the second communication device and the application server and further comprising:
   determining if the SIP INVITE with replaces header message comprises a takeover tag;
   determining if there is a media server involved in the communication session;
   in response to determining that the media server is not involved in the communication session and the SIP INVITE with replaces header message comprises the takeover tag, sending, to the second communication device, a SIP RE-INVITE message to reestablish the second dialog, wherein the SIP RE-INVITE message contains the second network address and wherein the second network address is used to reestablish a media stream between the first communication device and the second communication device.

5. The method of claim 1, wherein the SIP INVITE with replaces header message is received in response to a change in signal strength from a first network that uses the first network address to a second network that uses the second network address.

6. The method of claim 1, wherein the first communication device has a plurality of different network interfaces, wherein the SIP INVITE with replaces header message is received in response to one of the plurality of different network interfaces failing and/or the one of the plurality of different network interfaces being unable to communicate with the application server.

7. The method of claim 1, wherein the first communication device has a plurality of different network interfaces and wherein the SIP INVITE with replaces header message is received based on a user input to move the communication session from a first one of the plurality of different network interfaces to a second one of the plurality of different network interfaces.

8. The method of claim 1, wherein the first network address is a first Internet Protocol (IP) address on a first subnet and the second network address is a second IP address on a second subnet.

9. A system comprising:
   a communication processor that establishes a communication session between a first communication device and a second communication device, wherein the communication session comprises a first dialog between an application server and the first communication device and wherein the first communication device uses a first network address in the first dialog, and reestablishes the first dialog between the application server and the first communication device using a second network address in response to receiving a SIP INVITE with replaces header message from the first communication device with the second network address of the first communication device; and
   an application server that receives the SIP INVITE with replaces header message from the first communication device with the second network address.

10. The system of claim 9, wherein the SIP INVITE with replaces header message further comprises a takeover tag that identifies to the application server that the SIP INVITE with replaces header message is to be handled differently than a normal SIP INVITE with replaces header message, wherein the takeover tag tells the application server that it does not need to reestablish a second dialog between the application server and the second communication device.

11. The system of claim 10, wherein the communication session also comprises a second dialog between the second communication device and the application server and wherein the application server does not reestablish the second dialog in response to receiving the SIP INVITE with replaces header message with the takeover tag.

12. The system of claim 9, wherein the communication session also comprises a second dialog between the second communication device and the application server and wherein:
   the application server determines if the SIP INVITE with replaces header message comprises a takeover tag; determines if there is a media server involved in the communication session; and sends, to the second communication device, a SIP RE-INVITE message to reestablish the second dialog in response to determining that the media server is not involved in the communication session and the SIP INVITE with replaces header message comprises the takeover tag, wherein the SIP RE-INVITE message contains the second network address and wherein the second network address is used to reestablish a media stream between the first communication device and the second communication device.

13. The system of claim 9, wherein the SIP INVITE with replaces header message is received in response to a change in signal strength from a first network that uses the first network address to a second network that uses the second network address.

14. The system of claim 9, wherein the first communication device has a plurality of different network interfaces, wherein the SIP INVITE with replaces header message is received in response to one of the plurality of different network interfaces failing and/or the one of the plurality of different network interfaces being unable to communicate with the application server.

15. The system of claim 9, wherein the first communication device has a plurality of different network interfaces and wherein the SIP INVITE with replaces header message is received based on a user input to move the communication session from a first one of the plurality of different network interfaces to a second one of the plurality of different network interfaces.

16. The system of claim 9, wherein the first network address is a first Internet Protocol (IP) address on a first subnet and the second network address is a second IP address on a second subnet.

17. A first communication device comprising:
a processor that executes a communication module that establishes a communication session with a second communication device, wherein the first communication device uses a first network address to establish the communication session and sends a SIP INVITE with replaces header message with a second network address of the first communication device in response to the first communication device needing to use a different network address.

18. The first communication device of claim 17, wherein the SIP INVITE with replaces header message is sent in response to a change in signal strength from a first network that uses the first network address to a second network that uses the second network address.

19. The first communication device of claim 17, wherein the first communication device has a plurality of different network interfaces, wherein SIP INVITE with replaces header message is sent in response to one of the plurality of different network interfaces failing and/or the one of the plurality of different network interfaces being unable to communicate.

20. The first communication device of claim 17, wherein the SIP INVITE with replaces header message further comprises a takeover tag that identifies to an application server that the SIP INVITE with replaces header message is to be handled differently than a normal SIP INVITE with replaces header message, wherein the takeover tag tells the application server that it does not need to reestablish a second dialog between the application server and the second communication device.

* * * * *